US005955552A

United States Patent [19]
Sojka

[11] Patent Number: 5,955,552
[45] Date of Patent: *Sep. 21, 1999

[54] PROCESS FOR PRODUCING AN OIL AND WATER ADSORBENT POLYMER CAPABLE OF ENTRAPPING SOLID PARTICLES AND LIQUIDS AND THE PRODUCT THEREOF

[75] Inventor: Milan F. Sojka, Algonquin, Ill.

[73] Assignee: AMCOL International Corporation, Arlington Heights, Ill.

[*] Notice: This patent is subject to a terminal disclaimer.

[21] Appl. No.: 09/075,578

[22] Filed: May 11, 1998

Related U.S. Application Data

[60] Division of application No. 08/810,268, Mar. 3, 1997, which is a continuation-in-part of application No. 08/486,107, Jun. 7, 1995, Pat. No. 5,677,407, and application No. 08/486,455, Jun. 7, 1995, Pat. No. 5,618,877, which is a continuation-in-part of application No. 08/327,580, Oct. 24, 1994, abandoned.

[51] Int. Cl.$^6$ .............................. C08F 2/00; C08F 20/10
[52] U.S. Cl. .......................... 526/88; 526/323.2; 428/407
[58] Field of Search ................................ 526/323, 323.2; 428/407

[56] References Cited

U.S. PATENT DOCUMENTS

| 3,493,500 | 2/1970 | Volk et al. | 210/54 |
|---|---|---|---|
| 3,658,772 | 4/1972 | Volk et al. | 260/80.3 N |
| 3,759,880 | 9/1973 | Hoffmann et al. | 260/80.3 R |
| 3,915,921 | 10/1975 | Schlater | 260/17.4 |
| 3,966,902 | 6/1976 | Chromecek | 424/59 |
| 3,992,562 | 11/1976 | Denzinger et al. | 526/208 |
| 4,013,825 | 3/1977 | Denzinger et al. | 526/208 |
| 4,136,250 | 1/1979 | Mueller et al. | 528/29 |
| 4,224,427 | 9/1980 | Mueller et al. | 526/93 |
| 4,250,322 | 2/1981 | Efimov et al. | 560/26 |
| 4,276,402 | 6/1981 | Chromecek et al. | 526/264 |
| 4,341,889 | 7/1982 | Deichert et al. | 528/26 |
| 4,374,126 | 2/1983 | Cardarelli et al. | 424/81 |
| 4,414,278 | 11/1983 | Cohen t al. | 428/402 |
| 4,423,099 | 12/1983 | Mueller et al. | 428/35 |
| 4,509,949 | 4/1985 | Huang | 586/558 |
| 4,543,398 | 9/1985 | Bany et al. | 525/474 |

(List continued on next page.)

FOREIGN PATENT DOCUMENTS

| 0 206 072 A2 | 12/1986 | European Pat. Off. . |
|---|---|---|
| 0 301 532 A2 | 2/1989 | European Pat. Off. . |
| 0 371 421 A2 | 6/1990 | European Pat. Off. . |
| 59-9202-213 | 11/1984 | Japan . |
| 5-105729 | 4/1993 | Japan . |
| 5-140236 | 6/1993 | Japan . |
| 967051 | 8/1964 | United Kingdom . |
| 1 443 715 | 7/1973 | United Kingdom . |
| 2 090 264 | 7/1982 | United Kingdom . |

OTHER PUBLICATIONS

Lochhead et al., Encyclopedia of Polymers and Thickeners in Cosmetics, *Cosmetics and Toiletries*, vol. 108, May 1993 at pp. 95–138.

Yoshikazu et al., "New Emulsion System—Polymeric 'Water in Water' Emulsion," *Contemp. Topics in Polymer Sci.*, 14 575–586 (1984).

Davidson et al., "Microrheology of Thickened Suspension," *J. Colloid and Interface Science*, vol. 55, 163–169 (1975).

BF Goodrich Product Description "Carbopol® Water Soluble Resins," pp. 1–35.

DuPont Product Brochure, "VAZO® Polymerization Initiators, Uses, Storage and Handling," p. 1–16 (Jul. 1984).

Dow Corning Product Brochure, "Information About Dow Corning Silicone Fluids", 200® Fluid, 0.65cs and 200® Fluid, 1.0cs, (1993).

Dow Corning Product Brochure, "Information About Dow Corning Silicon Fluids", 200® Fluid, 1.5cs; 200® Fluid, 2.0 cs; and 200® Fluid, 5.0cs (1993).

Hüls American Inc. Product Borchure on Silicones, at pp. 16, 270, 271, 274, 275, and 298.

Dow Corning Product Brochure, "Information About Volatile Silicone Fluids," Dow Corning® 224, 245, 344, and 345 Fluids, 200® Fluid (0.65cs) from Dow Corning Corporation (1993).

*Primary Examiner*—Bernard Lipman
*Assistant Examiner*—N. Sarofim
*Attorney, Agent, or Firm*—Marshall, O'Toole, Gerstein, Murrau & Borun

[57] ABSTRACT

The present invention is directed to a porous polymer micro-particle, in the form of broken spheres, open to a porous oleophilic interior surface area, having a high oil and water absorbency and an apparent bulk density of about 0.02 to about 0.1 grams/cc. The preferred method of the present invention comprises the steps of:

dissolving at least one and preferably at least two polyunsaturated monomers along with an effective amount of an organic polymerization initiator in a water-immiscible organic solvent to provide a monomer mixture;

adding the monomer mixture to an aqueous solution, preferably having an effective amount of a suspension stabilizer dissolved therein, to form an organic/aqueous biphasic liquid system;

vigorously agitating the biphasic liquid system at a rate sufficient to cause the water-immiscible organic phase to be suspended as micro-droplets in the aqueous phase;

continuing vigorous agitating during polymerization of the monomers in the suspended micro-droplets to produce a microporous polymer micro-particle; and separating the microporous polymer micro-particle from the organic solvent to produce a microporous and oil sorbent polymer micro-particle having a mean unit diameter of less than about 25 microns and a total sorptive capacity for mineral oil that is at least about 72% by weight, preferably at least about 80% by weight dry polymer basis.

17 Claims, 4 Drawing Sheets

U.S. PATENT DOCUMENTS

| | | | |
|---|---|---|---|
| 4,675,426 | 6/1987 | Crivello | 526/194 |
| 4,690,825 | 9/1987 | Won | 424/501 |
| 4,709,767 | 12/1987 | Alexander | 175/65 |
| 4,724,240 | 2/1988 | Abrutyn | 514/847 |
| 4,794,140 | 12/1988 | Alexander | 524/827 |
| 4,873,091 | 10/1989 | Jankower et al. | 424/489 |
| 4,920,187 | 4/1990 | Kashihara et al. | 526/193 |
| 4,946,901 | 8/1990 | Lechner et al. | 525/305 |
| 4,962,133 | 10/1990 | Chromecek et al. | 521/56 |
| 4,962,170 | 10/1990 | Chromecek et al. | 526/212 |
| 5,130,343 | 7/1992 | Frechet et al. | 521/62 |
| 5,135,740 | 8/1992 | Katz et al. | 424/401 |
| 5,135,989 | 8/1992 | Ziemelis et al. | 525/330.6 |
| 5,145,685 | 9/1992 | Won | 424/78.31 |
| 5,147,937 | 9/1992 | Frazza et al. | 525/243 |
| 5,158,772 | 10/1992 | Davis | 424/401 |
| 5,189,102 | 2/1993 | Tsubuko et al. | 525/254 |
| 5,206,159 | 4/1993 | Cohen et al. | 435/180 |
| 5,208,038 | 5/1993 | Gressani et al. | 424/489 |
| 5,209,932 | 5/1993 | Nichols | 424/409 |
| 5,223,251 | 6/1993 | Nichols | 424/69 |
| 5,223,267 | 6/1993 | Nichols | 424/489 |
| 5,238,736 | 8/1993 | Tseng et al. | 428/327 |
| 5,246,972 | 9/1993 | Cifuentes et al. | 521/54 |
| 5,261,169 | 11/1993 | Williford | 36/43 |
| 5,288,814 | 2/1994 | Long, II et al. | 525/450 |
| 5,292,835 | 3/1994 | Jahns et al. | 526/73 |
| 5,316,774 | 5/1994 | Eury et al. | 424/501 |
| 5,320,835 | 6/1994 | Pahlck et al. | 424/64 |
| 5,330,822 | 7/1994 | Berg et al. | 428/192 |
| 5,336,740 | 8/1994 | Eian | 526/194 |
| 5,348,621 | 9/1994 | Rudy | 162/100 |
| 5,382,433 | 1/1995 | Pahlck et al. | 424/401 |
| 5,422,117 | 6/1995 | Morton et al. | 424/436 |
| 5,422,361 | 6/1995 | Munayyer et al. | 514/408 |
| 5,458,890 | 10/1995 | Williford et al. | 426/3 |
| 5,460,725 | 10/1995 | Stringfield | 210/690 |
| 5,498,678 | 3/1996 | Steffier | 526/200 |
| 5,510,117 | 4/1996 | Abate | 424/489 |
| 5,539,071 | 7/1996 | Steffler | 526/208 |

PROCESS FOR PRODUCING AN OIL AND WATER ADSORBENT POLYMER CAPABLE OF ENTRAPPING SOLID PARTICLES AND LIQUIDS AND THE PRODUCT THEREOF

CROSS-REFERENCE TO RELATED APPLICATION

This application is a divisional of U.S. patent application Ser. No. 08/810,268, filed Mar. 3, 1997, which is a continuation-in-part of application Ser. No. 08/486,107 filed Jun. 7, 1995, now U.S. Pat. No. 5,677,407, and application Ser. No. 08/486,455 filed Jun. 7, 1995, now U.S. Pat. No. 5,618,877, which is a continuation-in-part of application Ser. No. 08/327,580 filed Oct. 24, 1994, abandoned.

BACKGROUND OF THE INVENTION

A. Field of the Invention

The present invention relates to a process for producing an oil and water adsorbent polymer in broken micro-particle form capable of entrapping any desired solid and/or liquid oleophilic and/or hydrophilic compound and composition (organic and/or aqueous) for delivery. More particularly, the present invention relates to a process for producing a highly porous and highly cross-linked hydrophilic/oleophilic polymer in the form of open (broken) spheres and sphere sections characterized by a mean unit particle size of about 0.5 to about 3000 microns, preferably about 1 to about 300 microns, more preferably about 0.5 to about 100 microns, and most preferably, for cosmetic uses, about 0.5 to bout 80 microns. The micro-particles have an oil sorbency of at least about 72% by weight, preferably at least about 80% by weight (calculated as weight of material sorbed divided by total weight of material sorbed plus dry weight of polymer sorbent). The present invention is also directed to the oil and water adsorbent micro-particles produced by the process having an extremely low bulk density in the range of about 0.02 gm/cc to about 0.1 gm/cc, preferably about 0.03 gm/cc to about 0.07 gm/cc, more preferably about 0.03 gm/cc to about 0.04–0.05 gm/cc. The micro-particles produced by the process of the present invention are capable of holding and releasing oleophilic oils, creams, cleaners, medicaments and other organic active compounds and compositions, as well as hydrophilic active compounds and aqueous compositions, individually, or both oleophilic and hydrophilic materials simultaneously, for use in the cosmetic, cleaning, chemical process and pharmaceutical industries.

B. Background

Early disclosures of polymer particles appear in U.S. Pat. Nos. 3,493,500 and 3,658,772, which issued on Feb. 3, 1970 and Apr. 25, 1972, respectively. They teach the production of aqueous suspensions of polymer particles from acrylic acid monomer and/or acrylamide monomer in an aqueous reaction medium at pH 1–4. Both patents teach that the resultant polymer suspensions, which were not characterized as to particle size or structure, were suitable for use as flocculating agents for sewage treatment.

It was subsequently discovered that polymers could be made in a porous particulate form by a variety of techniques. The art has stated that "the type of polymerization technique used is an important factor in the determination of the resulting product." See U.S. Pat. No. 4,962,170 at column 2, line. 4. As stated in the '170 patent at column 2, lines 7–11, "within each type of polymerization, there are procedural alternatives which can have significant impact on the resulting product" "[t]he differences in the polymerization techniques are enough that a procedure used in one type of polymerization technique that will not necessarily have the same effect if used in another polymerization technique." Thus, there is a significant degree of unpredictability in the art.

Porous polymeric particles are capable of being prepared by one of two processes—precipitation polymerization in a single solvent system, or suspension polymerization in a two phase liquid system. The precipitation polymerization technique is presented in U.S. Pat. Nos. 4,962,170 and 4,962,133 both of which issued on Oct. 9, 1990. The '170 patent discloses a precipitation polymerization process wherein the disclosed monomers are soluble in the single solvent system, whereas the resulting polymer, which is insoluble, precipitates out of solution once a critical size is obtained. In the '170 process, the solution of monomer consists exclusively of one or more types of polyunsaturated monomer. Because each monomer is polyunsaturated, each monomer also functions as a cross-linker, resulting in a highly cross-linked polymer particle.

Like the '170 patent, the '133 patent also utilizes the precipitation polymerization process for producing a porous polymeric particle. However, unlike the '170 process, wherein the monomer solution consists exclusively of polyunsaturated monomers, the '133 process discloses the monomer solution may include one monosaturated monomer in combination with one polyunsaturated monomer, wherein the polyunsaturated monomer may comprise up to 90% by weight of the total weight of monomers. Because the precipitation polymerization technique relies upon the formation of polymer aggregates of precipitated polymer particles, the monomer solution is not vigorously agitated during polymerization to avoid separation of the aggregated polymer particles.

U.S. Pat. No. 5,316,774 is directed to a suspension polymerization process, again limited to a maximum of 90% by weight polyunsaturated monomers based on the total weight of monomers. Accordingly, it is an object of the present invention to provide a process for making sorbent micropolymers from a monomer solution that contains more than 90% by weight, preferably about 92% to 100% polyunsaturated monomers, by weight based on the total weight of monomers in the monomer solution.

The '133 process is limited to a solvent system that is an aqueous/organic azeotrope. Because the organic solvent cannot be separated from the water in an azeotrope, azeotropic solutions present special waste disposal problems. Accordingly, it is an object of the present invention to provide a process for making oil and water adsorbent micropolymers that does not require an azeotropic solution. Further, the particles produced by the '133 process range extensively in size from less than about 1 micron in average diameter for unit particles to about twelve hundred microns in average diameter for clusters of fused aggregates. The large variability in size limits the utility and properties of the polymeric particles. Accordingly, it is also an object of the present invention to provide a process for making polymeric micro-particles of a less diverse size distribution.

Another process disclosed in the art for producing microscopic polymers is in situ suspension polymerization wherein an active ingredient included within the monomer mixture is retained in the formed polymer upon completion of polymerization. Examples of in situ suspension polymerization include U.S. Pat. No. 4,724,240 wherein polymerization of a monounsaturated monomer and a polyunsaturated monomer in an aqueous/polyvinylpyrrolidone system containing an emollient, as the active agent, produced relatively large micro-particles, having a mean diameter "between 0.25 to 0.5 mm" (250 to 500 microns) that contains the emollient therein upon completion of polymerization. A problem with a particle having a mean diameter of 250–500 microns is that the particle is capable of being sensed by touch. This is an undesirable property if the particle is to be used in a lotion or cream or other cosmetic formulations. Accordingly, it is also an object of the present invention to provide a process that is capable of manufacturing polymeric particles having a smaller mean diameter, e.g., about 0.5 µm to about 120 µm, preferably about 1 µm to about 100 µm, for a smoother skin feel.

A second problem with the process of the '240 patent is that it is limited to those active ingredients that are capable of dissolving in the organic solvent. The polymeric micro-particles of the present invention are capable of adsorbing both (a) organic compounds and organic compositions containing oleophilic compounds dissolved in an organic solvent, as well as solid organic compounds entrapped within an interior of the open (broken) micro-particle sphere pores; and (b) liquid hydrophilic compounds and hydrophilic aqueous compositions containing water-soluble compounds dissolved in water, as well as solid hydrophilic solid compounds that are adsorbed on an exterior, porous surface area of the broken spheres. Further, the active ingredient(s), which may be proprietary, must be provided in bulk to the polymer manufacturer so that they may become trapped in the particles during the polymerization process. To overcome these problems, it is a further object of the present invention to provide polymeric micro-particles having evacuated internal pores, within broken (open) micro-particle spheres and sphere portions that are capable of adsorbing both oleophilic and hydrophilic solids and liquids in higher amounts than prior art micro-particles. It is theorized that the oleophilic solids and liquids are adsorbed within the interior porous surface area of each open sphere or sphere portion, in large amounts, so that they may be loaded within the interior of the spheres with adsorbed active oleophilic organic ingredient(s) in solid or solvent-dissolved form, and it is theorized that the exterior porous surface area of the broken spheres adsorb both hydrophilic and oleophilic solids and liquids via capillary adsorption in the porous outer surface (oleophilic materials) or by surface attraction of hydrophilic materials.

A third problem with the '240 process is that it is not suited for use when the active ingredient is a mixture of components that differ significantly from one another as to oleophilicity. In such a situation, the more oleophilic of the active ingredients would be selectively isolated in the pores of the polymer made by the '240 process. To overcome this problem, the '240 process would have to be separately applied to each of the active ingredients, and thereafter, the resulting products would be mixed. However, such additional processing and mixing is costly. Accordingly, it is a further object of the present invention to provide a process for producing a micro-particle wherein the micro-particle is capable of receiving a plurality of oleophilic active ingredients, and/or a plurality of hydrophilic active ingredients.

SUMMARY OF THE INVENTION

It was unexpectedly discovered that the process of the present invention is capable of producing micro-particles that have not only a high oil adsorbency, but that also exhibit a high adsorbency of water and hydrophilic compounds and aqueous compositions in a more uniform and narrower particle size distribution. The oleophilic materials or hydrophilic materials may be adsorbed alone or together to deliver materials separately or simultaneously. Both materials can be held simultaneously in the micro-particles of the present invention. Prior art materials such as Dow DC-5640 can hold oleophilic or hydrophilic materials, but not both simultaneously.

The present invention is directed to a process for making a porous polymer of micro-particulate size that exhibits a high oil and water adsorbency. The method of the present invention comprises the steps of:

dissolving at least one and preferably at least two polyunsaturated monomers along with an effective amount of an organic polymerization initiator in a water-immiscible organic porogen that is inert (not reactive) to the monomers and resulting polymer to provide a monomer mixture;

adding the monomer mixture to an aqueous solution, preferably having an effective amount of a suspension stabilizer dissolved therein, to form an organic/aqueous biphasic liquid composition including an organic phase and an aqueous phase;

vigorously agitating the biphasic liquid composition at a rate sufficient to cause the water-immiscible organic phase to be suspended as micro-droplets in the aqueous phase;

continuing vigorous agitation during polymerization of the monomers in the suspended micro-droplets to produce microporous polymer micro-particles in the form of broken (open) spheres; and separating the microporous polymer micro-particles from the organic solvent to produce a microporous, oil and water adsorbent polymer micro-particle having a mean unit diameter of less than about 50 microns, preferably less than about 25 microns, more preferably less than about 20 microns, and a new and unexpected adsorptive capacity for both hydrophobic and hydrophilic compounds, in both solid and liquid (organic solvent and aqueous) forms.

The present invention is further directed to microporous, oil and water adsorbent micro-particles comprising a polymer that includes at least two polyunsaturated monomers, the micro-particle characterized by being open to its interior, by virtue of particle fracture upon removal of the porogen after polymerization, or by virtue of subsequent milling, and having a mean unit diameter of less than about 50 microns, preferably less than about 25 microns, having a total adsorption capacity for organic liquids, e.g., mineral oil, within the pores of the interior, porous surface area of the particles, that is at least about 72% by weight, preferably at least about 80% by weight, and an adsorption capacity for hydrophilic compounds and aqueous solutions of about 70% to about 93% by weight, preferably about 75% to about 93% by weight. In a preferred embodiment, the broken sphere micro-particles of the present invention are characterized by a mean unit diameter from about 1 to about 50 microns, more preferably from about 1 to about 25 microns, most preferably, from about 1 to about 20 microns.

DETAILED DESCRIPTION OF THE INVENTION

Figure 1:
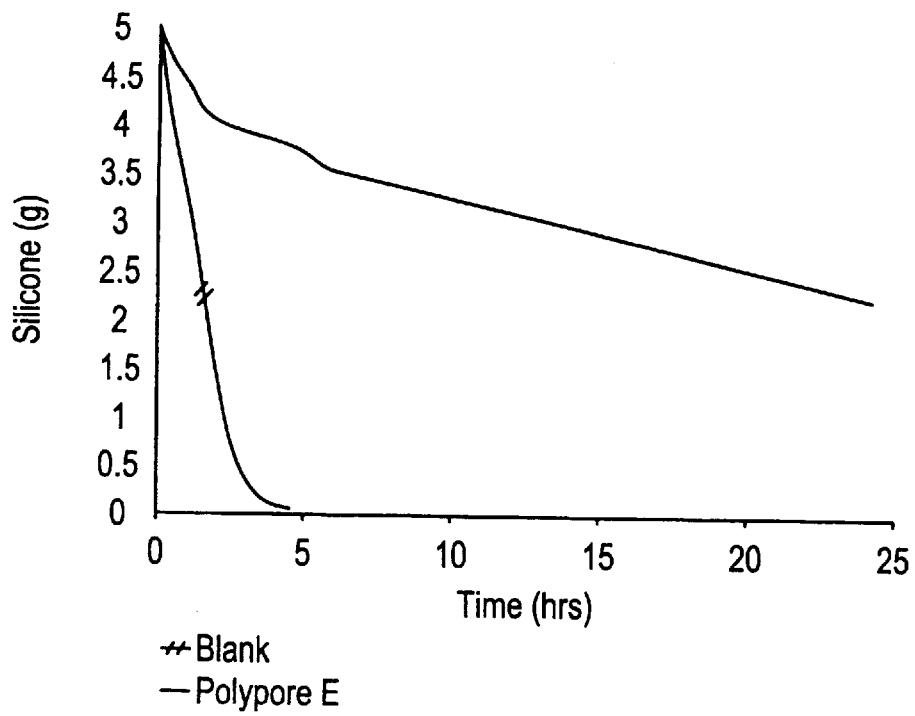
FIGS. 1 and 2 are graphs showing the time release of Silicone Fluid (DC 244) and vitamin E acetate, respectively, from the Poly-Pore E of Example 1, (tested under 10 liter/min air velocity), compared to vaporization of these materials from a non-sorbent open dish (blank)
Figure 2:
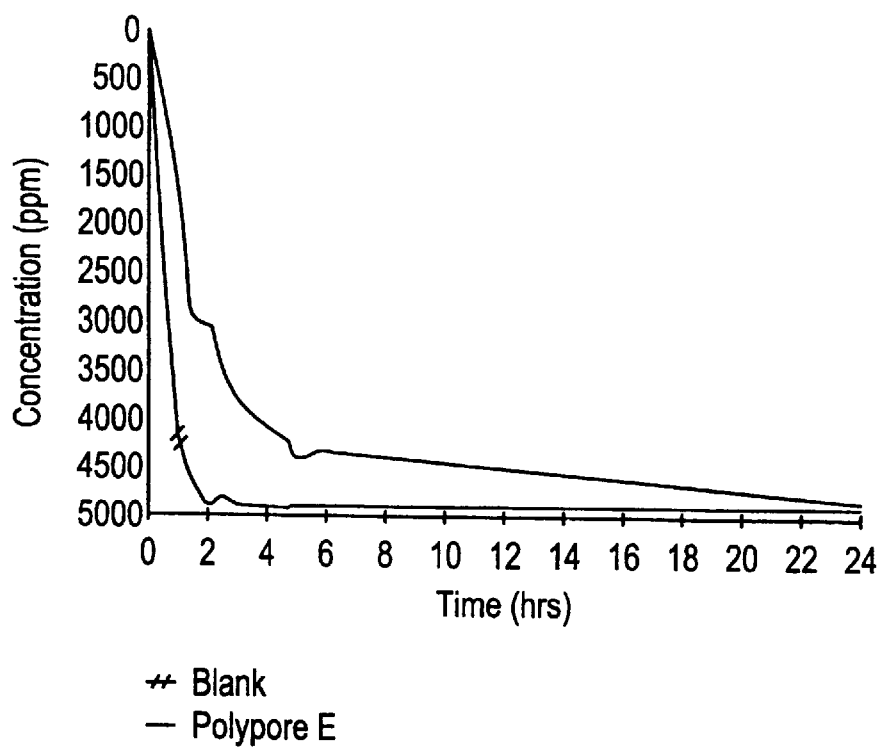
Figure 3:
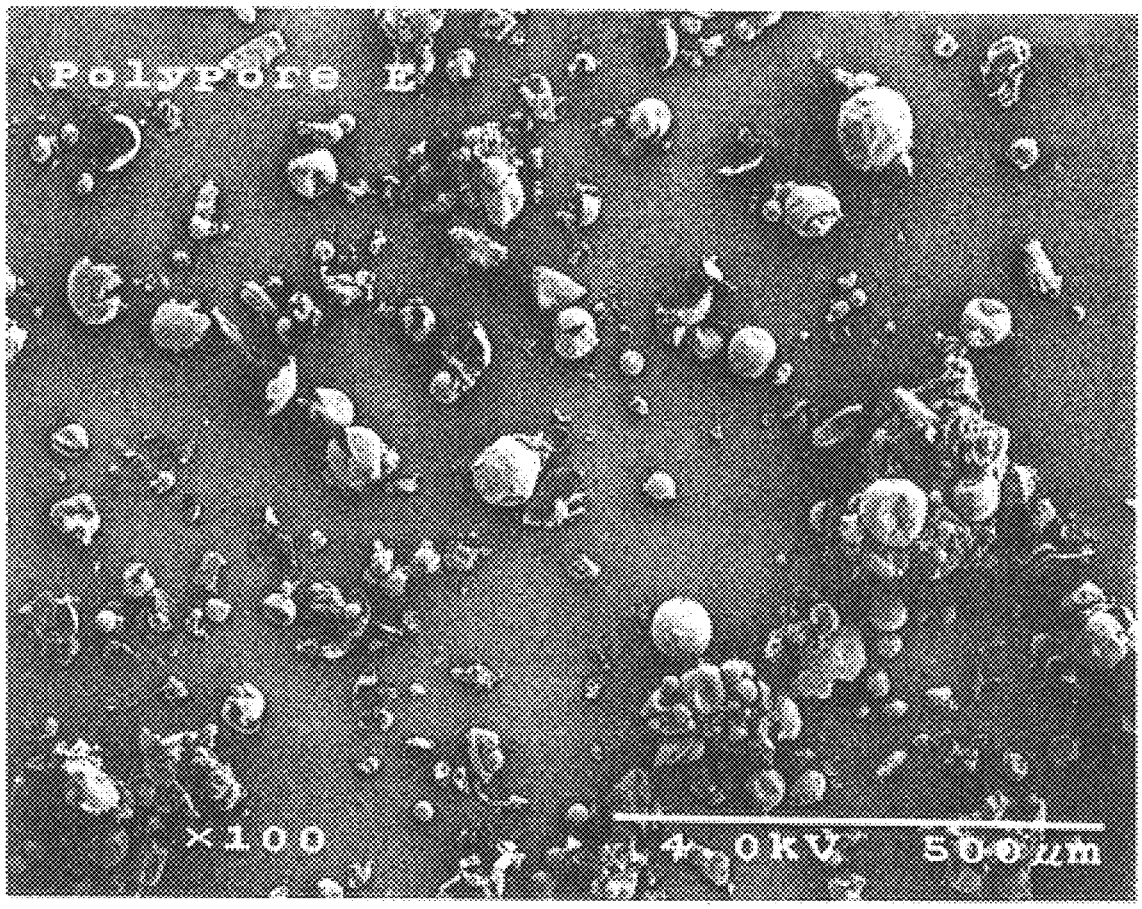
FIGS. 3–5 are photographs of the micro-particles of Example 1 magnified 100, 1500 and 10000 times, respectively.
Figure 4:
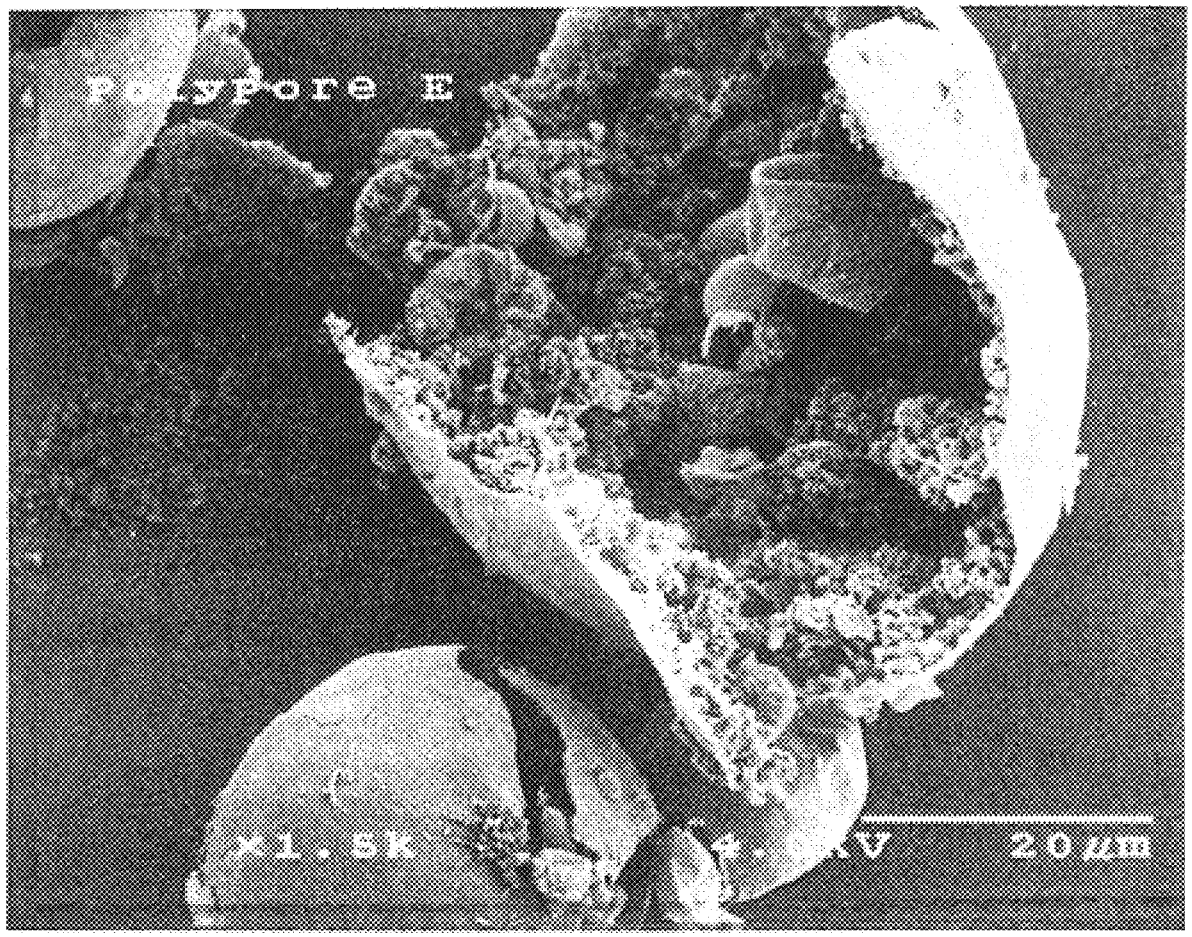
Figure 5:
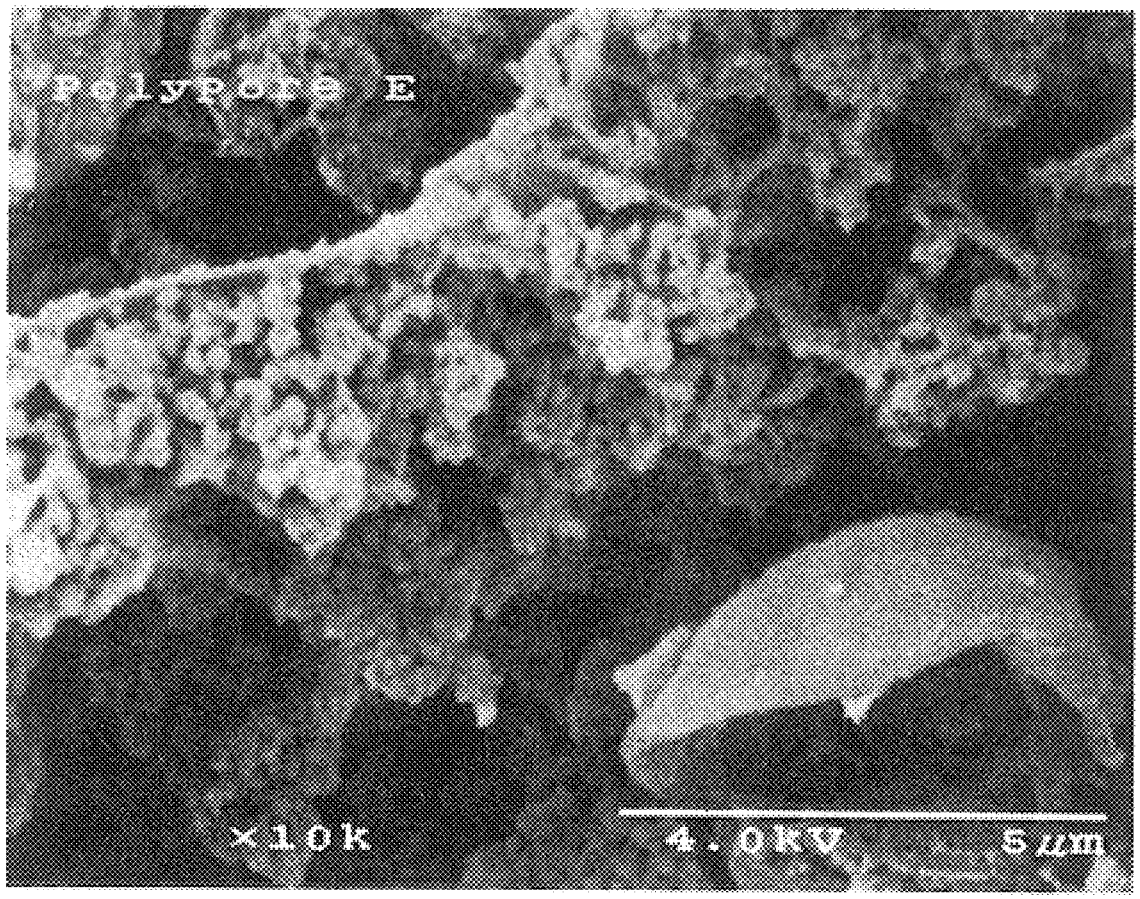

The present invention has two aspects. In its first aspect, it is directed to a process for making a polymer in a porous micro-particle form that is capable of sorbing high volumes of one or both of oleophilic (hydrophobic) and hydrophilic compounds in solid and/or liquid forms. Oleophilic compounds are adsorbed within the interior of the broken spheres, and adsorbed by capillary adsorption within pores in the outer surface area, and hydrophilic compounds are adsorbed on the exterior surfaces of the spheres, theoretically by electrostatic attraction with the exterior surfaces of the spheres by virtue of the surrounding water molecules present during the polymerization process. The preferred process of the present invention comprises the steps of:

- dissolving at least one or preferably at least two polyunsaturated monomers along with an effective amount of an organic polymerization initiator in a water-immiscible organic solvent to provide a monomer mixture;
- adding the monomer mixture to an aqueous solution, preferably having an effective amount of a suspension stabilizer dissolved therein, to form an organic/aqueous biphasic liquid system including an organic phase and an aqueous phase;
- vigorously agitating or otherwise shearing the biphasic liquid system at a rate sufficient to cause the water-immiscible organic phase to be suspended as micro-droplets in the aqueous phase e.g., by rotating a stirring paddle at a tip speed of about 1 to about 15 meters per second preferably at least about 5 meters per second, most preferably about 8 meters per second.
- continuing said vigorous agitation or other shear means during polymerization of the monomers in the suspended micro-droplets to produce a microporous polymer micro-particle; and
- separating the microporous polymer micro-particle from the organic solvent to produce microporous, oil and water adsorbent polymer micro-particles in the form of broken spheres having a mean unit diameter of less than about 50 microns and a new and unexpected adsorptive capacity for both oleophilic and hydrophilic compounds, in both solid and liquid (organic solvent and aqueous) forms.

The term "sorptive" (or "sorption") is used herein to refer to the capability or capacity of the micro-particles of the present invention to both adsorb and absorb lipophilic and hydrophilic materials. However, the amount of liquid that is absorbed is negligible in comparison to the amount of oleophilic and hydrophilic solids and/or liquids that are adsorbed on both the interior and exterior, respectively, of the broken spheres. In discussing micro-particles, the art loosely uses the term "adsorptive," such as in "total adsorptive capacity" or in "free flowing adsorptive capacity." However, it is understood that references in the art to "total adsorptive capacity" inherently include the total absorptive capacity of a particle as well as its adsorptive capacity, unless otherwise defined. Likewise, references in the art to "free flowing adsorptive capacity" also inherently include both the absorptive and adsorptive capacities.

The process of the present invention copolymerizes at least two polyunsaturated (polyethylenically unsaturated) monomers, preferably allyl methacrylate, and an ethylene glycol dimethacrylate. Both the allyl methacrylate and the ethylene glycol dimethacrylate are diunsaturated monomers. The diunsaturated monomers also function as cross-linking agents.

The highly cross-linked polymeric micro-particles of this invention are prepared by polymerizing at least one and preferably at least two monomers having at least two unsaturated bonds (hereinafter referred to as "polyunsaturated" monomers) said monomers being polymerized including no more than about 40% by weight, preferably less than about 9% by total monomer weight of monounsaturated comonomers. Examples of polyunsaturated monomers can be polyacrylates ("poly" meaning two or more), -methacrylates, or -itaconates of: ethylene glycol, propylene glycol; di-, tri-, tetra-, or poly-ethylene glycol and propylene glycol; trimethylol propane, glycerine, erythritol, xylitol, pentaerythritol, dipentaerythritol, sorbitol, mannitol, glucose, sucrose, cellulose, hydroxyl cellulose, methyl cellulose, 1,2 or 1,3 propanediol, 1,3 or 1,4 butanediol, 1,6 hexanediol, 1,8 octanediol, cyclohexanediol, or cyclohexanetriol. Similarly, bis(acrylamido or methacrylamido) compounds can be used. These compounds are, for example, methylene bis(acryl or methacryl)amide, 1,2 dihydroxy ethylene bis(acryl or methacryl)amide, hexamethylene bis (acryl or methacryl)amide.

Another group of useful monomers could be represented by di or poly vinyl esters, such as divinyl propylene urea, divinyl-oxalate, -malonate, -succinate, -glutamate, -adipate, -sebacate, -maleate, -fumerate, -citraconate, and -mesaconate.

Other suitable polyunsaturated monomers include divinyl benzene, divinyl toluene, diallyl tartrate, allyl pyruvate, allyl maleate, divinyl tartrate, triallyl melamine, N,N'-methylene bis acrylamide, glycerine dimethacrylate, glycerine trimethacrylate, diallyl maleate, divinyl ether, diallyl monoethyleneglycol citrate, ethyleneglycol vinyl allyl citrate, allyl vinyl maleate, diallyl itaconate, ethyleneglycol diester of itaconic acid, divinyl sulfone, hexahydro 1,3,5-triacryltriazine, triallyl phosphite, diallyl ether of benzene phosphonic acid, maleic anhydride triethylene glycol polyester, polyallyl sucrose, polyallyl glucose, sucrose diacrylate, glucose dimethacrylate, pentaerythritol di-, tri- and tetra-acrylate or methacrylate, trimethylol propane di- and triacrylate or methacrylate, sorbitol dimethacrylate, 2-(1-aziridinyl)-ethyl methacrylate, tri-ethanolamine diacrylate or dimethacrylate, triethanolamine triacrylate or trimethacrylate, tataric acid dimethacrylate, triethyleneglycol dimethacrylate, the dimethacrylate of bis-hydroxy ethylacetamide and the like.

Other suitable polyethylenically unsaturated cross-linking monomers include ethylene glycol diacrylate, diallyl phthalate, trimethylolpropanetrimethacrylate, polyvinyl and polyallyl ethers of ethylene glycol, of glycerol, of pentaerythritol, of diethyleneglycol, of monothio- and dithio-derivatives of glycols, and of resorcinol; divinylketone, divinylsulfide, allyl acrylate, diallyl fumarate, diallyl succinate, diallyl carbonate, diallyl malonate, diallyl oxalate, diallyl adipate, diallyl sebacate, diallyl tartrate, diallyl silicate, triallyl tricarballylate, triallyl aconitrate, triallyl citrate, triallyl phosphate, divinyl naphthalene, divinylbenzene, trivinylbenzene; alkyldivinylbenzenes having from 1 to 4 alkyl groups of 1 to 2 carbon atoms substituted on the benzene nucleus; alkyltrivinylbenzenes having 1 to 3 alkyl groups of 1 to 2 carbon atoms substituted on the benzene nucleus; trivinylnaphthalenes, and polyvinylanthracenes. In addition, acryl or methracryl-encapped siloxanes and polysiloxanes, methacryloyl end-capped urethanes, urethane acrylates of polysiloxane alchols and bisphenol A bis methacrylate and ethoxylated bisphenol A bis methacrylate also are suitable as polyunsaturated monomers.

Still another group of monomers is represented by di or poly vinyl ethers of ethylene, propylene, butylene, and the like, glycols, glycerine, penta erythritol, sorbitol, di or poly allyl compounds such as those based on glycols, glycerine, and the like, or combinations of vinyl allyl or vinyl acryloyl compounds such as vinyl methacrylate, vinyl acrylate, allyl methacrylate, allyl acrylate, methallyl methacrylate, or methallyl acrylate. In addition, aromatic, cycloaliphatic and heterocyclic compounds are suitable for this invention. These compounds include divinyl benzene, divinyl toluene, divinyl diphenyl, divinyl cyclohexane, trivinyl benzene, divinyl pyridine, and divinyl piperidine. Furthermore, divinyl ethylene or divinyl propylene urea and similar compounds may be used, e.g., as described in U.S. Pat. Nos. 3,759,880; 3,992,562; and 4,013,825, which are hereby incorporated by reference. Acryloyl- or methacryloyl endcapped siloxane and polysiloxanes such as those described in U.S. Pat. Nos. 4,276,402; 4,341,889, French Patent 2,465, 236, and German Publication GER OLS Patent 3,034,505, which are hereby incorporated by reference, are suitable for this invention. Methacryloyl end-capped urethanes, such as those described in U.S. Pat. Nos. 4,224,427; 4,250,322; and 4,423,099, German Publications GER OLS No. 2,365,631 and 2,542,314, Japanese Patent Application Nos. 85/233, 110; 86/09,424, and 86/30,566, and British Patent 1,443, 715, are suitable for this invention. Urethane acrylates of polysiloxane alcohols as described in U.S. Pat. Nos. 4,543, 398 and 4,136,250 and bisphenol A bis methacrylate and ethoxylated bisphenol A bis methacrylate are also suitable monomers for this invention.

Monoethylenically unsaturated monomers suitable, in an amount up to about 40% preferably less than about 9% by weight, based on the total weight of monomers, for preparing polymer micro-particles include ethylene, propylene, isobutylene, disobutylene, styrene, vinyl pyridine ethylvinylbenzene, vinyltoluene, and dicyclopentadiene; esters of acrylic and methacrylic acid, including the methyl, ethyl, propyl, isopropyl, butyl, sec-butyl, tert-butyl, amyl, hexyl, octyl, ethylhexyl, decyl, dodecyl, cyclohexyl, isobornyl, phenyl, benzyl, alkylphenyl, ethoxymethyl, ethoxyethyl, ethoxyproyl, propoxymethyl, propoxyethyl, propoxypropyl, ethoxyphenyl, ethoxybenzyl, and ethoxycyclohexyl esters; vinyl esters, including vinyl acetate, vinyl propionate, vinyl butyrate and vinyl laurate, vinyl ketones, including vinyl methyl ketone, vinyl ethyl ketone, vinyl isopropyl ketone, and methyl isopropenyl ketone, vinyl ethers, including vinyl methyl ether, vinyl ethyl ether, vinyl propyl ether, and vinyl isobutyl ether; and the like.

Other monounsaturated monomer materials which may be utilized in accordance with the present invention, in an amount up to about 40%, preferably less than about 9% by weight, based on the total weight of monomers in the monomer solution, include hydroxy alkyl esters of alpha, beta-unsaturated carboxylic acids such as 2-hydroxy ethylacrylate or methacrylate, hydroxypropylacrylate or methacrylate and the like. Many derivatives of acrylic or methacrylic acid other than the esters mentioned are also suitable as starting monounsaturated monomer materials for use in forming the unsaturated polymer micro-particles of the present invention. These include, but are not limited to the following monomers: methacrylylglycolic acid, the monomethacrylates of glycol, glycerol, and of other polyhydric alcohols, the monomethacrylates of dialkylene glycols and polyalkylene glycols, and the like. The corresponding acrylates in each instance may be substituted for the methacrylates. Examples include the following: 2-hydroxyethyl acrylate or methacrylate, diethylene glycol acrylate or methacrylate, 3-hydroxypropyl acrylate or methacrylate, tetraethyleneglycol acrylate or methacrylate, pentaethyleneglycol acrylate or methacrylate, dipropyleneglycol acrylate or methacrylate, acrylamide, methacrylamide, diacetone acrylamide methylolacrylamide methylolmethacrylanide, any acrylate or methacrylate having one or more straight or branched chain alkyl groups of 1 to 30 carbon atoms, preferably 5 to 18 carbon atoms, and the like. Other suitable examples include isobornyl methacrylate, phenoxyethyl methacrylate, isodecyl methacrylate, stearyl methacrylate, hydroxypropyl methacrylate, cyclonexyl methacrylate, dimethylaminoethyl methacrylate, t-butylaminoethyl methacrylate, 2-acrylamido propane sulfonic acid, 2-ethylexyl methacrylate, methyl methacrylate, ethyl methacrylate, butyl methacrylate, 2-hydroxyethyl methacrylate, tetrahydrofurfuryl methacrylate and methoxyethyl methacrylate.

Examples of monounsaturated monomers containing carboxylic acid groups as functional groups and suitable for use as starting materials in accordance with the invention include the following: acrylic acid, methacrylic acid, itaconic acid, aconitic acid, cinnamic acid, crotonic acid, mesaconic acid, maleic acid, fumaric acid and the like.

Partial esters of the above acids are also suitable as monosaturated monomers for use in accordance with the invention. Instances of such esters include the following: mono-2-hydroxypropyl aconitate, mono-2-hydroxyethyl maleate, mono-2-hydroxypropyl fumarate, mono-ethyl itaconate, monomethyl cellosolve ester of itaconic acid, monomethyl cellosolve ester of maleic acid, and the like.

Instances of suitable monounsaturated monomers containing amino groups as functional groups include the following: diethylaminoethyl acrylate or methacrylate, dimethylaminoethyl acrylate or methacrylate, monoethylaminoethyl acrylate or methacrylate, tert. butylaminoethyl methacrylate, para-amino styrene, ortho-amino styrene, 2-amino-4-vinyl toluene, piperidinoethyl methacrylate, morpholinoethyl methacrylate, 2-vinyl pyridine, 3-vinyl pyridine, 4-vinyl pyridine, 2-ethyl-5-vinyl pyridine, dimethylaminopropyl acrylate and methacrylate, dimethylaminoethyl vinyl ether, dimethylaminoethyl vinyl sulfide, diethylaminoethyl vinyl ether, amonoethyl vinyl ether, 2-pyrrolidinoethyl methacrylate, 3-dimethylaminoethyl-2-hydroxy-propylacrylateormethacrylate, 2-aminoethyl acrylate or methacrylate, isopropyl methacrylamide, N-methyl acrylamide or methacrylamide, 2-hydroxyethyl acrylamide or methacrylamide, 1-methacryloyl-2-hydroxy-3-trimethyl ammonium chloride or sulfomethylate, 2-(1-aziridinyl)-ethyl methacrylate, and the like. Polyethylenically unsaturated monomers which ordinarily act as though they have only one unsaturated group, such as isoprene, butadiene and chloroprene, should not be calculated as part of the polyunsaturated monomer content, but as part of the monoethylenically unsaturated monomer content.

The process of the present invention preferably utilizes an effective amount of an organic polymerization initiator to cause polymerization to occur in the organic phase solvent. However, other methods of initiating polymerization may be used instead, such as UV light, actinic radiation, or the like. By way of example, suitable organic initiators include the organic peroxide initiators, such as dibenzoyl peroxide or t-butyl peroctoate, or the azo initiators. Preferred initiators are the azo initiators such as 2,2'-azobisisobutyronitrile and 2,2'-azobis(2,4-dimethylpentanenitrile). An especially preferred azo initiator is 2,2'-azobis(2,4-dimetylpentanenitrile), which is commercially available under the tradename VAZO 52 from DuPont, Wilmington, Del. A typical effective amount of organic initiator relative to dry monomer was found to be about 0.5–2% by weight, preferably about 1–1.2% by weight.

Examples of redox systems include secondary or tertiary amines and, most preferably amine (preferably tertiary) and peroxide combinations. The ratio between the peroxide and the amine may vary from 0.1 to 5 moles of amine per mole of peroxide. It is useful to first dissolve the peroxide in a part of the solvent, and separately dissolve the amine in the other part of the solvent, then mix the peroxide part with the monomer solution at room temperature and, subsequently, add the amine part. The charging of the peroxide and amine part can be done at the beginning of the reaction or in portions throughout the reaction period. These amines are generally of the formula $R_2NH$ or $R_3N$ wherein R is an alkyl or substituted alkyl, cycloalkyl, or aryl group. Preferably the amine is a tertiary amine.

Illustrative reducing agents of this invention are methyl-butyl amine, bis(2-hydroxyethyl)butyl amine, butyldimethyl amine, dimethyl amine, dibenzylethyl amine, diethylmethyl amine, dimethylpentyl amine, diethyl amine, 2,2',2"-trihydroxy dipropyl ethyl amine, di-n-propylene amine, 2,2', 2"-trimethyl tributyl amine, triethyl amine, dimethyl aminoacetal, pentylhexyl amine, triethanolamine, trihexyl amine, trimethyl amine, trioctadecyl amine, tripropyl amine, trisopropyl amine, tetramethylene diamine, and esters of para-amino benzoic acid, e.g., p-dimethyl amino-2-ethylhexyl-benzoate, dimethyl aminoethyl acetate, 2-(n-butoxy)ethyl 4-dimethylaminobenzoate, 2-(dimethylamino) ethyl benzoate, ethyl-4-dimethylaminobenzoate, methyldiethanolamine, dibutyl amine, N,N-dimethylbenzylamine, methylethyl amine, dipentyl amine and peroxide $Fe^{2+}$.

Other preferred initiators are selected from inorganic initiators such as sodium, potassium, and/or ammonium persulfates, and hydrogen peroxide.

In the preferred process of the present invention, the monomers and the organic initiator are dissolved in a substantially water-immiscible organic solvent porogen to produce the organic phase. Suitable substantially water-immiscible organic porogens include the aliphatic and aromatic hydrocarbons. Typical of these solvents are toluene, cyclohexane, silicone solvents, including fluoro silicone, chlorinated solvent, such as trichlor ethylene, tetrachlormethane; dichlormethane and the like, and one or more of the heptanes, alone or in combination. Based upon considerations of boiling point, volatility, toxicity, and solubility, a heptane is the more preferred solvent; most preferably, n-heptane.

Polymerization is accomplished by dissolving the monomers or their mixtures in an inert porogen which does not react with the monomers or the resulting polymer. Based on the parts by weight of the monomer and the solvent totalling 100 parts by weight, the monomers are used from 0.1 to less than about 25 parts by weight, preferably, from about 2 to less than about 25 parts by weight, and, more preferably, from about 5 to about 20 parts by weight. Correspondingly, the solvent porogen is present from greater than about 60 parts by weight, preferably greater than about 70 parts by weight, more preferably greater than about 75–80 parts by weight to 99.9 parts by weight, preferably, from greater than about 75 parts by weight to about 98 parts by weight, and, most preferably, from about 80 parts by weight to about 95 parts by weight. No surfactant or dispersing aid is required.

Preferably, the porogen is relatively volatile, having a boiling point of less than about 200° C., more preferably less than about 180° C., at one atmosphere and is water-miscible. The removal of the porogen can be accomplished by filtration and evaporation, e.g., by heat and/or vacuum, or the porogen can be left adsorbed by the polymeric spheres, on the interior of the spheres if lipophilic or on the outer surfaces of the spheres if hydrophilic. The polymer can be washed with a suitable solvent, e.g., isopropyl alcohol, acetone, silicone fluids, and mixtures thereof, before it is dried.

Suitable porogens include a wide range of substances, notably inert, non-polar organic solvents. Some of the most convenient examples are alkanes, cycloalkanes, and aromatics. Specific examples of such solvents are alkanes of from 5 to 12 carbon atoms, straight or branched chain cycloalkanes of from 5 to 8 carbon atoms, benzene, and alkyl-substituted benzenes, such as toluene and the xylenes.

Porogens of other types include $C_4$–$C_{20}$ alcohols, perfluoro polyethers, and silicone oils. Examples of silicone oils are poly-dimethylcyclosiloxane, hexamethyldisiloxane, cyclomethicone, dimethicone, amodimethicone, trimethylsilylamodimethicone, polysiloxane-polyalkyl copolymers (such as stearyl dimethicone and cetyl dimethicone), dialkoxydimethylpolysiloxanes (such as stearoxy dimethicone), polyquarternium 21, dimethiconepropyl PG-betaine, dimethicone copolyol and cetyl dimethicone copolyol. Removal of the porogen may be effected by solvent extraction, evaporation, or similar conventional operations.

The process of the present invention also utilizes an aqueous phase. The aqueous phase comprises an aqueous solution, preferably having an effective amount of a suspension stabilizer dissolved therein. Suspension stabilizers are well known in the art. Suitable suspension stabilizers include starch, gum arabic, polyvinyl alcohol, sodium polymethacrylate, magnesium silicate, sodium bentonite clay, methyl cellulose, magnesium hydroxide ($M_g(OH)_2$); polyvinyl pyrolidone (PVP); poly vinyl alcohol (PVOH); calcium phosphate; magnesium phosphate and lignites. A preferred suspension stabilizer is methyl cellulose, such as is commercially available from Dow Chemical Company, Midland, Mich., under the tradename Methocel A4C Premium.

In performing the process of the present invention, the organic phase is combined under an inert (e.g., Argon or Nitrogen) atmosphere with an aqueous phase. The combination is typically performed at about room temperature (about 23° C.) and at a ratio of organic phase to water phase of 10% to 90% by weight organic phase with 90% to 10% by weight water phase. Preferably about 50%–90% by weight water is included to assure that each suspended organic phase droplet is completely surrounded by water during polymerization of the monomer(s) in the organic phase. The combined phases should be vigorously stirred, or otherwise subjected to sufficient shear to separate the organic phase into micro-droplets (having a diameter of about 1 μm to 120 μm) surrounded by the aqueous phase. The stirring or shearing may commence during or after the combination of the two phases. Preferably, the vigorous stirring is employed during the combination of the two phases. More preferably, the organic phase is added slowly with vigorous stirring or vigorous agitation to the aqueous phase. By the phrase "vigorous agitation" as used herein is meant that the stirring paddle or impeller is rotated at a tip speed of about 1 meter per second to about 15 meters per second preferably at least about 5 meters per second, more preferably about 5–10 meters per second, most preferably about 8 meters per second. For example a paddle stirrer is rotated at a speed between about 800–2000 revolutions per minute ("rpm"), preferably at about 1400–1600 rpm. The function of the vigorous agitation is to facilitate the separation of the organic phase into micro-droplets that become isolated from one another as discrete mini-reaction vessels that are surrounded by water. In the process of the present invention, the water functions not only to separate the micro-droplets but also as a heat transfer vehicle for the transfer of heat to micro-droplets of monomers to initiate the exothermic polymerization reactions occurring in each micro-droplet, and to render the outer surfaces of the micro-particles hydrophilic for adsorption of hydrophilic compounds and aqueous compositions.

The polymerization reaction is allowed to proceed in the vigorously agitated reaction mixture by raising the reaction temperature. As disclosed in Example 1, at about 46° C., some polymerization was observed in the stirred reaction mixture. At about 53° C., massive polymerization was observed. The mixture is then preferably heated to about 60° C. to 65° C. to drive the polymerization reaction to completion. Once the monomers have been polymerized through gelation and cross-linking, vigorous agitation can be stopped while maintaining slow agitation for heat transfer and homogeneity during subsequent polymer curing; or vigorous agitation can be continued.

Once polymerization is completed, the resulting microporous polymer micro-particles are separated from the reaction mixture, such as by filtering or by screening. At this point, however, the separated particles are filled with the water-immiscible porogen of the reaction mixture. By selecting a porogen that is also volatile, the porogen can be removed readily from the internal pores of the polymer particles, preferably by steam distillation. Most of the micro-particle spheres are fractured via escape of porogen from an interior of the micro-particle spheres at this point in the process. If the porogen is left in place as an active ingredient of the polymer product, the spheres can be broken by milling. Once the microporous polymer micro-particles have been separated from the water-immiscible organic solvent, such that the oleophilic interior surfaces of the broken spheres are now evacuated, they become the preferred embodiment of the microporous, oil and water adsorbent polymer micro-particles of the present invention. Theoretically, the interior of the spheres adsorb oleophilic compounds and the exterior of the spheres adsorb both oleophilic and hydrophilic compounds. Alternatively, the porogen(s) can remain in place as an active material (in situ suspension polymerization).

Thus, the present invention is also directed to a composition of matter—a microporous and oil and water adsorbent micro-particle in the form of broken spheres comprising a polymer formed by polymerizing at least one and preferably at least two polyunsaturated monomers (each containing at least two carbon to carbon double bonds) optionally including one or more monounsaturated monomers, in an amount up to about 40% by weight preferably no more than about 9% by weight, most preferably 0 to about 5% monounsaturated monomers based on the total weight of monomers. It has been found that adsorptive capacity increases dramatically as the percentage of monounsaturated monomers approaches zero. The resulting micro-particles, in the form of broken hollow spheres having non-smooth, irregular porous interior surfaces that provide more surface area than the outer surface of the spheres, having a mean unit diameter of less than about 50 microns, preferably less than about 25 microns, have total adsorption capacity for mineral oil that is 72% by weight or greater, based upon the total weight of the polymer plus adsorbed oil, preferably at least about an 80%, most preferably about 80% to about 93% by weight adsorptive capacity for oleophilic compounds and compositions, e.g., organics, such as mineral oil, and an adsorption capacity for hydrophilic compounds and aqueous solutions thereof of at least about 70% by weight, and preferably about 75% to about 90% by weight adsorption capacity for aqueous solutions/dispersions and hydrophilic solids, based on the total weight of polymer plus adsorbed aqueous/hydrophilic material. The phrase "mean unit diameter" refers to mean diameter of the individual particle and not to the diameter of agglomerates which may form from time to time due to static charge or otherwise. The mean unit diameter of the micro-particle is more preferably from about 1 to about 25 microns; most preferably, from about 1 to about 20 microns.

Particles can be manufactured having particle sizes up to about 3000 um, particularly about 1000 um to about 2000 um. A preferred particle size distribution spans about 1–100 microns, more preferably about 1 to about 80 microns, with particles generally not less than about 0.5 micron in size, with most particles being about 1 micron or larger.

Preferably, the micro-particles of the present invention have a total adsorption capacity for mineral oil of about 74% by weight or greater; more preferably, about 76% by weight or greater; most preferably about 78–80% by weight or greater. The most preferred particles have an adsorption capacity for mineral oil of at least about 90% by weight, based on the total weight of particles plus adsorbed oil. It is not expected that the sorption capacity of the polymers of the present invention for light mineral oil would exceed about 95% by weight, based on the total weight of polymer plus adsorbed mineral oil.

The micro-particles of the present invention appear as a white powder and constitute free flowing discrete solid particles even when loaded with a hydrophilic and/or oleophilic material to their "free flowing" sorption capacity, e.g., about 85% by weight for the particles of Example 1 (POLY PORE™ 200) when loaded with mineral oil. In a preferred microporous, oil and water adsorbent micro-particle of the present invention, two diunsaturated monomers are copolymerized—one of the polyunsaturated monomers being an ethylene glycol dimethacrylate, preferably monoethylene glycol dimethacrylate. The preparation of such a micro-particle is described in Example 1 herein, wherein the other diunsaturated monomer is allyl methacrylate and the mole ratio of allyl methacrylate:monoethylene glycol dimethacrylate was within a preferred molar ratio of allyl methacrylate:ethylene glycol dimethacrylate of 1:1 to 1:2, specifically 1:1.22.

The polymers of the present invention, containing at least one and preferably at least two polyunsaturated monomers, have a superior total adsorption capacity for mineral oil over the (BMA/EGDM) copolymers and a commercially available copolymer (MMA/EGDM). In particular, the polymer of Example 1 exhibited a total sorption capacity for mineral oil of 91.7% by weight, compared to 72.2% by weight for the best reported BMA/EGDM copolymer of the prior art and 64% by weight for the commercially available product (Dow Corning Product No. 5640).

The abbreviations used herein are identified as follows:

| | |
|---|---|
| BMA | butyl methacrylate |
| EGDMA | monoethylene glycol dimethacrylate |
| AMA | allyl methacrylate |
| MMA | methyl methacrylate |

EXAMPLE 1

2 diunsaturated monomers Poly Pore™ E 200

5.25 grams of Methocel A4C Premium was dissolved in 573.3 grams of water in a 2000 ml three-necked resin equipped with a stirrer, thermometer, condenser and Argon purge. A solution of 40.92 grams of allyl methacrylate, 76.48 grams of ethylene glycol dimethacrylate, 765.20 grams of n-heptane and 2.33 grams of Vazo 52 was bubbled with Argon for 10 minutes. The resultant mix was slowly added to the 1,500 rpm stirred aqueous solution of the Methocel at 23° C. under Argon. The temperature was raised to 46° C. with constant agitation when precipitation started. Massive polymerization was observed at 53° C. The reaction mixture was then heated to 60° C. to 65° C. and that temperature was held for an additional six hours. Thereafter, the reaction mixture was subjected to steam distillation to remove the heptane and residual monomers. The copolymer was separated from the reaction mixture by filtration. The separated copolymer was washed with deionized water and dried in an oven at 80° C. The dried polymer was an odorless, white, soft powder having a total adsorption capacity for light mineral oil of 11.1 grams/1 gram, and apparent density of 0.032 g/cc, a mole ratio of allyl methacrylate:ethylene glycol dimethacrylate 1:1.22, and a corresponding ratio mole percent 46:54. The particle size distribution was analyzed and was as follows:

| High Size | Under % |
|---|---|
| 80.0 | 100 |
| 71.9 | 99.8 |
| 64.7 | 99.5 |
| 58.2 | 99.0 |
| 52.3 | 98.2 |
| 47.1 | 97.1 |
| 42.3 | 95.1 |
| 38.1 | 92.0 |
| 34.2 | 88.2 |
| 30.8 | 82.8 |
| 27.7 | 75.7 |
| 24.9 | 67.5 |
| 22.4 | 58.6 |
| 20.1 | 49.7 |
| 18.1 | 41.4 |
| 16.3 | 34.3 |
| 14.6 | 28.6 |
| 13.2 | 23.9 |
| 11.8 | 20.1 |
| 10.7 | 17.1 |
| 9.58 | 14.8 |
| 8.62 | 12.7 |
| 7.75 | 11.0 |
| 6.97 | 9.5 |
| 6.27 | 8.2 |
| 5.64 | 7.1 |
| 5.07 | 6.1 |
| 4.56 | 5.3 |
| 4.10 | 4.5 |
| 3.69 | 3.9 |
| 3.32 | 3.4 |
| 2.98 | 2.9 |
| 2.68 | 2.5 |
| 2.41 | 2.2 |
| 2.17 | 1.9 |

-continued

| High Size | Under % |
|---|---|
| 1.95 | 1.7 |
| 1.75 | 1.5 |
| 1.58 | 1.3 |
| 1.42 | 1.1 |
| 1.28 | 1.0 |
| 1.15 | 0.9 |
| 1.03 | 0.7 |
| 0.93 | 0.6 |
| 0.83 | 0.4 |
| 0.75 | 0.3 |
| 0.68 | 0.2 |
| 0.61 | 0.2 |
| 0.55 | 0.1 |
| 0.49 | 0.1 |
| 0.44 | 0.1 |
| 0.40 | 0.0 |
| 0.36 | 0.0 |
| 0.32 | 0.0 |
| 0.29 | 0.0 |
| 0.26 | 0.0 |
| 0.23 | 0.0 |
| 0.21 | 0.0 |
| 0.19 | 0.0 |
| 0.17 | 0.0 |
| 0.15 | 0.0 |
| 0.14 | 0.0 |
| 0.12 | 0.0 |
| 0.11 | 0.0 |
| 0.10 | 0.0 |

EXAMPLE 2

The copolymer powder of Example 1 was mixed with zinc pyrithione (solids having a particle size of 3 to 5 microns slurried in water) to a content of 12 grams of slurry per one gram of the polymer and dried in an oven at 80° C. to evaporate water. The dry polymeric powder was of white, fine powder with 85% entrapped zinc pyrithione, i.e., 5.76 grams per gram. Zinc pyrithione is supplied by Ruetger Nease Company as mixture of 48% of zinc pyrithione, 51% water and 1% zinc chloride and is used as antidandruff component in hair care products, e.g., antidandruff shampoos.

EXAMPLE 3

The copolymer of Example 1 was loaded with methanol/salicylic acid solution to a content of 12 grams per gram, and dried in an oven at 80° C. to evaporate methanol. The dry polymeric powder was white, fine powder, with 74% entrapped salicylic acid, i.e, 2.8 grams per gram. Entrapped salicylic acid is not light sensitive, nor explosive. Salicylic acid is an antiseptic and antifungel agent.

EXAMPLE 4

Solution was made by dissolving 1 gram of dibenzoyl peroxide in 8 grams of chloroform. The solution was adsorbed in 1 gram of polymer of Example 1, thereafter chloroform was evacuated, and entrapped dibenzoyl peroxide polymer system was pulverized to very fine white powder. Usually dibenzoyl peroxide is shock sensitive and has tendency to explode at contact with metals. The entrapped dibenzoyl peroxide polymer system was inactive to friction, to shock and to contact with metals. The loading capacity of dibenzoyl peroxide was 50%, i.e., 1 gram per gram.

EXAMPLE 5

Retinol was dissolved in same amount of ether 5.5. grams of the solution was adsorbed in 1 gram of the polymer powder of Example 1. Thereafter ether was evacuated by vacuum and free flowing light yellow powder was obtained. The Retinol capacity was 2.5 grams per gram, i.e., 71%. Usually Retinol is in the form of sticky crystals, it is light sensitive, and skin irritant, is used in cosmetic formulations and as vitamin.

EXAMPLE 6

The procedure for preparation of the polymer in the Example 1 was repeated except that 46 mole percent allyl methacrylate monomer (cross-linker #1) was copolymerized with 54 mole percent ethylene glycol dimethacrylate (cross-linker #2), mole ratio 1:1.22. Porogen (n-heptane) content was 69% by weight to monomers weight.

Total adsorption capacity for light mineral oil of the resultant polymer was 81%, i.e., 4.3 grams of mineral oil per one gram of the polymer.

EXAMPLES 7–11

The same monomers with same mole ratio were employed, as in Example 6, however porogen (n-heptane) concentration was increased in each series of syntheses. Due to the augmented porogen concentration, the adsorption capacities were enhanced and the apparent densities were decreased. In each instance submicron size copolymeric powders, in the form of broken micro-spheres, were produced. Adsorption capacities of the various copolymeric powders for light mineral oil were determined and are shown in Table 1.

TABLE 1

| Example No. | Porogen % | Adsorption Capacity g/1 g | Apparent Density g/cc 25 |
| --- | --- | --- | --- |
| 7 | 69 | 4.3 | 0.084 |
| 8 | 80 | 5.9 | 0.069 |
| 9 | 82.5 | 6.5 | 0.049 |
| 10 | 86 | 9.7 | 0.036 |
| 11 | 87.7 | 11.1 | 0.032 |

EXAMPLES 12–14

Adsorptive polymers were obtained following the procedure of Examples 7–11, except that various monomer combinations were employed, all with 87.7% of n-heptane as a porogen. Adsorption capacities of the various polymeric powders were determined and are shown in Table 2.

TABLE 2

| Example No. | Porogen % | Adsorption Capacity g/g Min. Oil | Apparent Bulk Density g/cc |
| --- | --- | --- | --- |
| 12 | 85 | 9.1 | 0.038 DMAEMA/EGDM |
| 13 | 85 | 8.7 | 0.049 VAC/ST/EGDM |
| 14 | 85 | 10 | 0.036 1,4 BDDMA |

The abbreviations used in Table 2:
DMAEMA Dimethylaminoethyl Methacrylate
EGDM Ethylene Glycol Dimethacrylate
VAC Vinyl Acetate
ST Styrene
1,4 BDDMA 1,4 Butandiol Dimethacrylate The micro-particles of Example 1 (Poly-Pore™ E 200) was tested for adsorption of various solid and liquid hydrophilic and oleophilic materials for adsorption and free-flowing capacities with the results shown in TABLE 3:

TABLE 3

|  | Total (g/g) | Free-Flowing (g/g) |
| --- | --- | --- |
| Water | 7.8 | 6.0 |
| Mineral Oil | 10.4 | 8.1 |
| Artificial Sebum | 10.8 | 8.1 |
| Glycerin | 8.0 | 6.0 |
| Cyclomethicone (DC 244) | 12.0 | 9.6 |
| Isopropyl Myristate | 10.7 | 8.0 |
| Vitamin E Acetate | 7.2 | 5.6 |
| Benzophenone-3 | 12.3 | 9.2 |
| PEG 200 | 11.2 | 8.8 |
| Benzyl Acetate | 12.3 | 10.2 |
| Fragrance/Floral Lavender (Q-12512) | 11.1 | 8.1 |
| Dimethicone (DCC 10) | 10.6 | 8.5 |
| Dimethicone (DCC 200) | 10.2 | 7.1 |
| Dimethicone (DCC 350) | 10.0 | 6.9 |
| Dimethicone (DCC 1000) | 10.0 | 6.9 |
| Motor Oil (10 W 40) | 10.1 |  |
| Heptane | 8.0 |  |
| Toluene | 10.0 |  |
| Xylene | 9.6 |  |
| Methylene Chloride | 18.8 |  |
| Irgasan DP 300 5-chloro-2-(2, 4 dichloro-phenoxy)phenol | 10.0 |  |

What is claimed is:

1. A process for producing a microporous oil sorbent polymer comprising the steps of:
   dissolving a polyunsaturated monomer in a substantially water-immiscible organic solvent to provide a monomer mixture containing more than 60% by weight polyunsaturated monomers;
   combining said monomer mixture with an aqueous solution to form a biphasic liquid system;
   shearing said biphasic liquid system in an amount sufficient to cause said water-immiscible organic phase, containing said dissolved monomers, to be suspended as micro-droplets in said aqueous phase;
   polymerizing said monomers in said suspended micro-droplets during shearing to produce a microporous, copolymer micro-particle therein; and
   separating said microporous polymer micro-particle from said substantially water-imiscible organic solvent to produce a microporous oil and water adsorbent polymer micro-particle, in the form of broken spheres, characterized by having a mean unit diameter of less than about 50 microns, and having a total adsorption capacity for mineral oil that is 74% by weight or greater, based on the total weight of the micro-particle plus mineral oil.

2. The process of claim 1, wherein said polyunsaturated monomer is an ethylene glycol dimethacrylate selected from the group consisting of monoethylene glycol dimethacrylate; diethylene glycol dimethacrylate; triethylene glycol dimethacrylate; and mixtures thereof.

3. The process of claim 2, wherein said dimethacrylate is monoethylene glycol dimethacrylate.

4. The process of claim 3, wherein another of said polyunsaturated monomer is dissolved in the water-immiscible organic solvent, and wherein said another monomer is allyl methacrylate in a mole ratio of allyl methacrylate:monoethylene glycol dimethacrylate of 4:6.

5. The process of claim 3, wherein said water-immiscible solvent is an aromatic or aliphatic hydrocarbon.

6. The process of claim 5, wherein said substantially water-immiscible organic solvent is a heptane.

7. The process of claim 6, wherein said heptane is n-heptane.

8. The process of claim 5, further including adding a suspension stabilizer to said monomer mixture and wherein said suspension stabilizer is selected from the group consisting of starch, gum arabic, polyvinyl alcohol, sodium polymethacrylate, magnesium silicate, sodium bentonite, methyl cellulose, and mixtures thereof.

9. The process of claim 8, wherein said suspension stabilizer is a methylcellulose.

10. The process of claim 9 further including adding a polymerization initiator to said monomer mixture.

11. The process of claim 10, wherein said polymerization initiator is an azo nitrile type initiator.

12. The process of claim 10, wherein the mean unit particle diameter is from about 1 to about 25 microns.

13. The process of claim 12, wherein the mean unit particle diameter is from about 1 to about 20 microns.

14. The process of claim 1, wherein said micro-particles are further characterized by having a particle size distribution wherein a majority of said micro-particles have a particle size between about 6.2 and about 32.7 microns.

15. The process of claim 1, wherein said micro-particles have a bulk density of about 0.02 to about 0.1 gm/cc.

16. The process of claim 15, wherein said micro-particles have a bulk density of about 0.03 to about 0.07 gm/cc.

17. The process of claim 15, wherein said micro-particles have a bulk density of about 0.03 to about 0.05 gm/cc.

* * * * *